Figure 1:
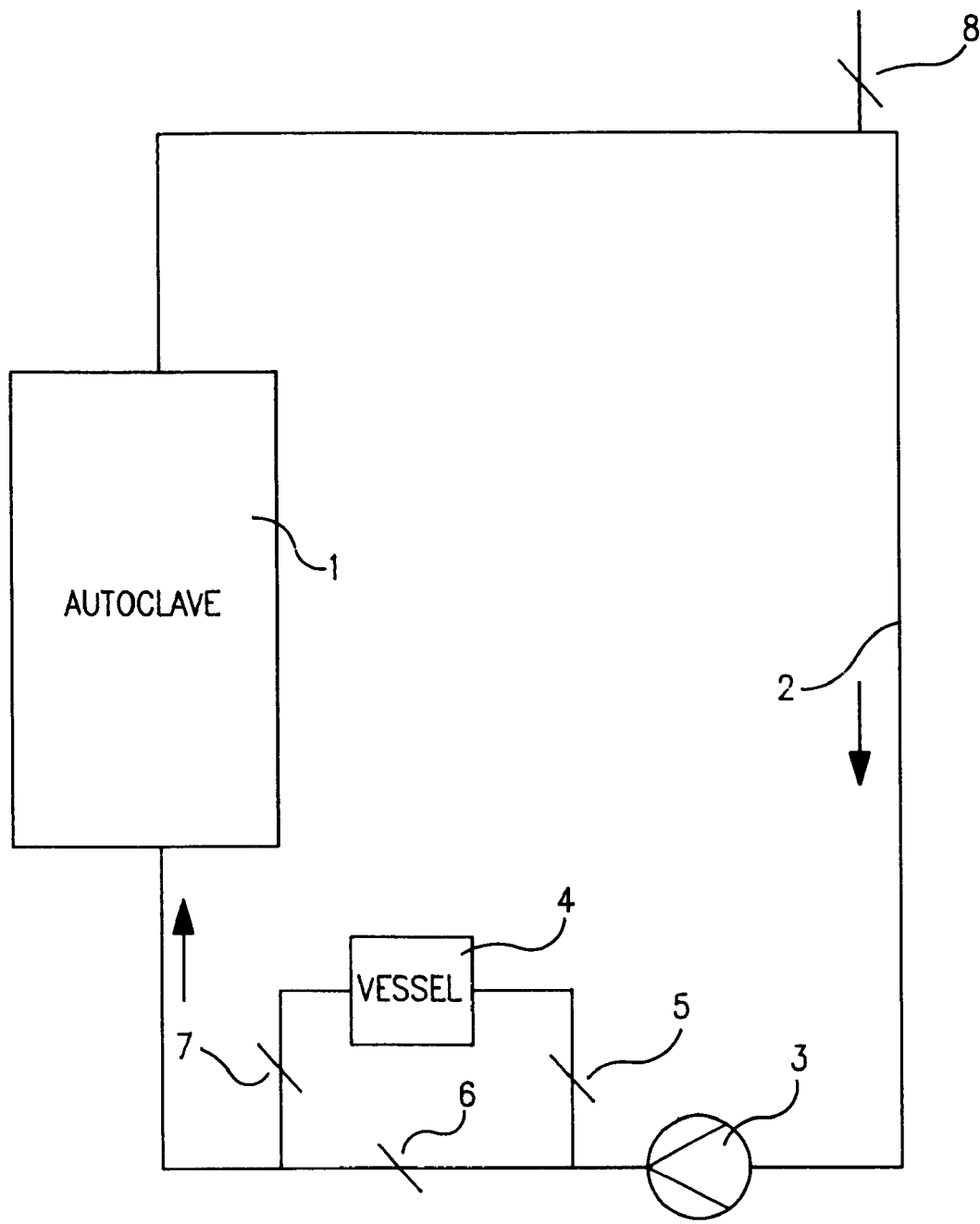

United States Patent
Eggers et al.

[11] Patent Number: 5,972,045
[45] Date of Patent: Oct. 26, 1999

[54] PROCESS FOR THE DYEING OF A TEXTILE SUBSTRATE

[75] Inventors: Rudolf Eggers, Buxtehude; Joachim von Schnitzler, Hamburg; Gottlob Wörner, Bönnigheim, all of Germany

[73] Assignee: Amann & Sohne GmbH & Co., Bonnigheim, Germany

[21] Appl. No.: 08/930,108

[22] PCT Filed: Aug. 5, 1996

[86] PCT No.: PCT/DE96/01458

§ 371 Date: Jan. 22, 1998

§ 102(e) Date: Jan. 22, 1998

[87] PCT Pub. No.: WO97/13915

PCT Pub. Date: Apr. 17, 1997

[30] Foreign Application Priority Data

Oct. 6, 1995 [DE] Germany .......................... 195 37 317

[51] Int. Cl.[6] .................................. D06P 3/54; D06P 7/00
[52] U.S. Cl. ...................... 8/475; 8/922; 8/149.2; 8/155; 8/611
[58] Field of Search ................... 8/440, 475, 552, 8/922, 611, 149.2, 155

[56] References Cited

U.S. PATENT DOCUMENTS 5,199,956  4/1993  Schlenker et al. .
5,269,815  12/1993  Schlenker et al. .......................... 8/475

FOREIGN PATENT DOCUMENTS

| 514 337 | 11/1992 | European Pat. Off. . |
| 34 06 724 | 9/1990 | Germany . |
| 4 237 823 | 4/1994 | Germany . |
| 42 38 621 | 5/1994 | Germany . |
| 42 38 622 | 5/1994 | Germany . |
| WO 93/14259 | 7/1993 | WIPO . |
| WO 94/18264 | 8/1994 | WIPO . |

OTHER PUBLICATIONS

"Application of Supercritical Carbon Dioxide in Finishing Process," D. Knittel, W. Saus, and E. Schollmeyer, *Journal of the Textile Institute,* No. 4, pp. 534–552 (Oct. 1993).

"Activitéennoblissment," *L'Industrie Textile,* No. 1233, p. 58 (June. 1992).

*Primary Examiner*—Margaret Einsmann
*Attorney, Agent, or Firm*—Proskauer Rose LLP

[57] ABSTRACT

A process is disclosed for dyeing a textile substrate, in particular for dyeing polyester yarns. The substrate to be dyed is placed in an autoclave and a supercritical fluid containing at least one dyestuff is applied to it, i.e. passed through it. The supercritical fluid is pumped continuously via a circulation system allocated to the autoclave, and, in order to terminate the dyeing process, the pressure and/or temperature is lowered and/or the volume is increased. Immediately before and/or during the pressure and/or temperature reduction and/or volume increase, as much as possible of any residual dye which has not been transferred to the substrate is removed from the fluid.

50 Claims, 3 Drawing Sheets

PROCESS FOR THE DYEING OF A TEXTILE SUBSTRATE

The present invention is directed to a method for the dyeing of a textile substrate, particularly for the dyeing of yarn consisting of polyester, with the characteristics of the generic part of patent claim 1.

In the textile finishing usually textile substrate are dyed in aqueous systems, whereby for example for the dyeing of fabrics, yarns, filaments or fibres of polyester generally disperse dyes are used which, however, are in soluble in aqueous systems. This causes the fact that at the beginning of the dyeing a monomolecular dispersion of the dye has to be manufactured in aqueous systems from the disperse dye being generally insoluble in aqueous systems with the aid of a corresponding dispersing agent. The known dyeing in an aqueous system does not only require the adding of corresponding dispersing agents but causes at the same time a high environmental stress which can be referred to the fact that, on one hand, a relatively high amount of water is necessary and that thus a correspondingly high amount of effluent emerges and that, on the other hand, a reductive further cleansing has to be carried out in order to obtain acceptable fastnesses for medium and dark color shades, whereby the amount of effluent is increased again.

In order to avoid the afore described and examplarily mentioned disadvantages, it is proposed to exchange the water being required for the transport of the dye by a supercritical fluid in the case of a usual dyeing.

A method with the characteristics of the generic part of patent claim 1 is known from the DE 39 06 724. In the known method the textile substrate to be correspondingly dyed is hereby arranged in an autoclave and perfused, respectively superfused, by the supercritical fluid containing at least one dye, whereby the supercritical fluid is introduced continuously into the autoclave by a circulation system of the autoclave and also drawn out of the autoclave, in order to cause this way the desired perfusion, respectively superfusion, of the textile substrate to be dyed. In addition to the required pumps and the corresponding tube conducts, for example heat exchangers and/or dye-preparing vessels can be located within this circulation system.

After the supercritical fluid containing the at least one dye has perfused, respectively superfused, the textile substrate for a given time, according to the known method, a pressure decrease, temperature decrease and/or volume change occurs at the end of the dyeing, in order to thus convert the supercritical fluid into the corresponding gas.

The DE-OS 39 06 724 points out an essential advantage of the method described therein which can renounce on a reductive cleansing for dyeing and disperse dyes even in the case of medium and dark color shades, without risking hereby a deterioration of the color fastnesses. This statement may be correct for laboratory dyeings described in the DE-OS 39 06 724, but it did not prove to be correct for the highly technical realisation of the dyeing of textile substrates, particularly such substrates that contain polyester. Hereby it was observed that the afore mentioned substrates dyed with at least one disperse dye showed bad color fastnesses after having been dyed in a supercritical fluid, so that such a dyed textile substrate, particularly in a medium and dark color shade, could not be traded without being additionally treated again.

The present invention has the object to dispose a method of the mentioned kind for the dyeing of textile substrates in a supercritical fluid at a high level of color fastness.

According to the invention, this object is realised by a method with the significant characteristics of patent claim 1.

The inventive method for the dyeing of a textile substrate, particularly for the dyeing of yarns consisting of polyester with disperse dyes provides that the substrate to be dyed is arranged within an autoclave where it is perfused, respectively superfused, with a supercritical fluid containing at least one dye. Hereby the supercritical fluid is transported continuously by the circulation system of the autoclave in such a way that the supercritical fluid containing the at least one dye is drawn out of the autoclave, preferably in the cover section, and entered into the autoclave, preferably in the bottom section, after passing the circulation system, whereby the circulation system is eventually provided with further equipment, as for example a heat exchanger and/or dye-preparing vessel. After the textile substrate to be dyed, according to the inventive method, was perfused, respectively superfused, for a preselected dyeing time which causes an absorption of the main amount of the originally used dye by the corresponding textile substrate to be dyed and thus the remaining of a relatively small amount of the unabsorbed dye in the supercritical fluid, the inventive method provides that this remaining amount of the at least one dye not being absorbed by the textile substrate is mainly removed from the fluid before and/or during the realisation of the pressure decrease and/or temperature decrease and/or volume increase. In other words, before and/or during the ending of the method, meaning after the end of the predetermined dyeing time and thus before and/or during the pressure decrease and/or temperature decrease and/or volume increase, the textile substrate being at this time already dyed is not furtherly perfused, respectively superfused, by the such a fluid which still comprises considerable remaining amounts of the unabsorbed dye. In this final step of the inventive method a fluid is rather used which is mainly freed from dye residues, in order to perfuse, respectively superfuse, the textile substrate, so that at the same time and/or hereafter the pressure decrease and/or temperature decrease and/or volume increase takes place, without the deposition of dye residues on the textile substrate.

It was surprisingly noted that, by applying the inventive method, the textile substrate being already dyed was not considerably decolorated, although the textile substrate is perfused, respectively superfused, with a fluid which is mainly freed of dye or which does not contain any dye at about the end of the actual method, meaning at a moment in which no considerable modification of the color shade or of the color intensity of the dyed textile substrate occurred or in which a desired color of the textile substrate was obtained. The dyeings realised according to the inventive method show a high color fastness, particularly a high friction resistance, water fastness, washing resistance and/or sweat resistance. For that reason it is not necessary to furtherly treat, for example to reductively treat, the textile substrate dyed according to the inventive method after the method has ended, even not when medium to very dark color shades were obtained by the inventive method. Such an improvement of the color fastnesses is referred to the fact that in the inventive method at the end of the dyeing method being also named the end of the dyeing no dye residue remains in the fluid which perfuses, respectively superfuses, the dyed textile substrate, so that correspondingly no nonfixed dye is precipitated and thus emitted from the textile to be correspondingly dyed immediately before and/or during the pressure decrease and/or temperature decrease and/or volume increase, whereas this is always the case in a highly technical application of the usual method described in the DE-OS 39 06 724. This emitted, respectively filtered, dye then causes a deterioration of the color fastnesses in the initially described known method.

In order to obtain in the inventive method particularly reproducible good fastnesses, a first development of the inventive method provides that the at least one dye existing in the supercritical fluid and not being absorbed by the textile substrate is removed from the fluid before the realisation of the pressure decrease and/or temperature decrease and/or volume increase. In other words, in this first development of the inventive method firstly the unabsorbed dye is removed from the supercritical fluid without it being necessary to modify the pressure and/or the temperature of the correspondingly used supercritical fluid and then the dyeing is terminated by the realisation of the pressure decrease and/or temperature decrease and/or volume increase. Hereby it was observed that in this first development of the inventive method the dye residues existing in the supercritical fluid and not being absorbed by the textile substrate are removed in a particularly safe way.

The afore described advantages of the inventive method are particularly obvious when such dyes are used for the dyeing of the textile substrate that facilitate a relatively low bath extract (bath exhaustion), meaning such dyes that are absorbed by the textile substrate only to about 85% to about 95% relative to the originally used dye amount. Even when such dyes are used that are extracted from the bath at a maximum to about 97% to about 98%, the afore described fastness deteriorations always occur if these dyes are not dyed by means of the inventive method.

It is a further advantage of the inventive method that hereby the fluid used for the corresponding dyeing is cleaned, since at the end of the dyeing the unabsorbed dye is mainly removed from the fluid. This leads to the fact that a fluid cleaned in this way can be blown off or collected and then used again for later dyeing without any problems. Moreover, the unabsorbed dyes existing in the fluid or others hereafter described accompanying components can be easily removed and wasted in an environmentally appropriate way or recycled.

In the inventive method the amount of the unabsorbed dye to be removed by the inventive method depends on which dyes are used and which color depth and color fastnesses are to be obtained with the inventive method. In the case of light colored dyes, meaning such dyeings having a dye concentration that varies between about 0.01% by weight and about 0.5% by weight relative to the weight of the textile substrate to be dyed, and in the case of such dyes facilitating a maximum bath extract, it is sufficient to remove about 50% by weight of the unabsorbed dye from the fluid at the end of the dyeing, particularly before and/or during the pressure decrease, temperature decrease and/or volume increase. If, in contrast to that, particularly good color fastnesses are required, if dyes with a relatively low bath extract are used and/or if medium to dark color shades are to dyed with the inventive method, whereby the dye concentration of medium color shades varies between about 0.5% by weight and about 3% by weight and of darker color shades varies between 3% by weight and 10% by weight, then it is advisable to remove at least 80% by weight of the unabsorbed dye particularly before and/or during the realisation of the pressure decrease and/or temperature decrease and/or volume increase.

A particularly suitable and advantageous embodiment of the inventive method provides that for the removal of the at least one unabsorbed dye the supercritical fluid containing the unabsorbed dye is transmitted from the autoclave and from the corresponding circulation system into a second circulation system, whereby in the second circulation system the unabsorbed dye is then removed from the fluid. This second circulation system is preferably arranged relative to the first circulation system in such a way that the second circulation system can function as bypass to the first circulation system, so that the removal of the unabsorbed dye from the fluid is carried out at the end of the dyeing optionally independently of the corresponding dyeing or particularly at the same time of the corresponding dyeing.

It is, however, particularly suitable if in the inventive method the fluid containing the unabsorbed dye is entered into the second circulation system at the end of the dyeing, meaning particularly before and/or during the realisation of the pressure decrease and/or temperature decrease and/or volume increase, so that the fluid is mainly set free of the unabsorbed dye and entered again into the autoclave and the corresponding circulation system after the removal of these dyes in the second circulation system. Hereby the fluid which flows through the autoclave and the corresponding circulation system and which still contains dye residues is diluted, so that the concentration of the dye residue is reduced furtherly in a desired way. Moreover, this variant of the method shows the advantage that the supercritical fluid which is said free of dye residues and enters back into the autoclave is guided through the circulation, whereby the corresponding procedure costs are reduced. It is, however, also possible to separately recondition the supercritical fluid containing the dye residues and transmitting it into the second circulation system and to store it in a corresponding tank, whereas fresh fluid is then entered into the autoclave and the corresponding circulation system.

In order to mainly remove in the afore described embodiments of the inventive method the at least one unabsorbed dye from the supercritical fluid at the end of the dyeing, the inventive method provides three advantageous options that can be applied either alternatively or in common.

In the case of the first option the unabsorbed dye is removed from the fluid in the second circulation system caused by the fact that, by means of a pressure decrease, temperature decrease and/or volume increase, the solving capacity of the fluid for the at least one unabsorbed dye is reduced to such an extent that the dye as such is precipitated from the fluid. This kind of method shows the advantage that in addition to the at least one dye also other components solved in the fluid during the dyeing, as for example oils, lubricants, oligomers and others, can be easily removed from the fluid. Hereby the extent of the pressure decrease, temperature decrease and/or volume increase depends on the solving behavior of the unabsorbed dye, respectively on the afore mentioned other components of the fluid, whereby the pressure and temperature can be decreased and/or the volume can be increased to such an extent that the fluid leaves the supercritical condition and thus converts into a liquid and/or a gas. It is required, however, for the feeding of this liquid or gas to induce a temperature and/or pressure increase, in order to transfer the corresponding fluid back into its supercritical condition and to enter it into the autoclave and the corresponding circulation system, as far as the at least one unabsorbed dye is removed at the end of the dyeing before the realisation of the pressure decrease, temperature decrease and/or volume increase.

In the case of the second option of the inventive method, the unabsorbed dye is removed in the second circulation system by being adsorbed and/or absorbed by a at least one sorbent. In comparison with the afore described first option, this option of the inventive method shows the advantage that hereby the adsorption and/or the absorption of the unabsorbed dye can take place in the supercritical fluid, so that then a new pressure and/or temperature increase is not anymore necessary, in order to enter the corresponding cleaned supercritical fluid being free of the unabsorbed dye back into the autoclave and the corresponding circulation system and in order to subsequently cause the pressure decrease, temperature decrease and/or volume increase required for the termination of the dyeing.

It is certainly also possible to combine the afore described two options, which means that it is possible to decrease the pressure and/or the temperature of the fluid containing the dye residue and to concurrently bring this fluid into contact with the sorbent in the second circulation system. This combined option is always applied when the solving behavior of the corresponding dye in the used fluid and under the chosen temperature and pressure conditions is still elevated to such an extent that it is necessary to provide a relatively large amount of sorbents, in order to induce a desired adsorption and/or absorption. This combined method can also be advantageous when further components being solved in the supercritical fluid during the dyeing are to be removed from the supercritical fluid, whereby these further components are particularly oils, lubricants, preparations and/or oligomers.

In respect to the sorbent which is used in the afore described embodiment of the inventive method, it is to be generally noted that herefore any such sorbent is suitable which does not react with the correspondingly used fluid and which is stable under the selected temperature and pressure conditions. It proved to be particularly suitable to use such a sorbent that is selected from the group consisting of aluminum oxides, silica gels, activated carbons and/or zeolithic molecular sieves. These sorbents allow to a high extent a rapid and easy adsorption and/or absorption of the unabsorbed dye, particularly of a unabsorbed disperse dye, so that correspondingly to that only small amounts of the sorbent are required. It is, however, also possible to use mixtures of the afore indicated special sorbents, whereby these mixtures are particularly used when the dye residues to be removed from the fluid are of such dyestuffs, which differ clearly in their polarity and/or their molecular weight and/or their steric size.

The afore mentioned sorbents are then preferably used as sphere-shaped or rod-shaped sorbents, in order to thus obtain a possibly dense and space-saving packing when the sorbents are impeccably superfused.

For particularly extreme requirements it is advisable to select such sorbents which have a hard inert core, as for example a glass or steel core, and which are provided with a corresponding outer layer of the sorbent. From such sorbents well and homogeneously superfusable packings can be generated.

Particularly high deposition rates can be obtained in the inventive method when such a sorbent is selected having a particle size of between 0.5 mm and 20 mm, preferably between 1 mm and 10 mm. The packings generated hereof are packed in a dense way and can be superfused nevertheless in an impeccable and homogeneous way.

In respect to the density of the correspondingly chosen sorbent, it is to be noted that this density varies between 1,800 kg/m$^3$ and 3,500 kg/m$^3$, preferably between 2,000 kg/m$^3$ and 3,000 kg/m$^3$, whereas the porosity of the sorbent lays between 0.3 and 0.8, preferably between 0.4 and 0.7.

In the inventive method the inner surface of the correspondingly selected sorbent depends on the amount of the at least one unabsorbed dye to be correspondingly precipitated from the fluid. If the fluid to be correspondingly cleaned comprises only a small amount of the dye residue, which is always the case when the inventive method uses such dyes for the dyeing of relatively light color shades the that have a high bath extract, as for example higher than 95%, then a sorbent is selected having an inner surface of between about 200 m$^2$/g and about 700 m$^2$/g. If, however, the fluid to be correspondingly cleaned comprises a relatively high amount of dye residues, which is particularly the case when the inventive method is applied for the dyeing of medium or dark color shades or for the use of badly absorbing dyes, then a sorbent is selected which has an inner surface of between about 700 m$^2$/g and 1,500 m$^2$/g. Altogether it is to be observed that thus the inner surface of the sorbent selected for the inventive method varies particularly between 200 m$^2$/g and 1,500 m$^2$/g, preferably between 300 m$^2$/g and 1,200 m$^2$/g.

The same is the case for the pore volume of the sorbent selected for the inventive method, whereby the pore volume varies particularly between 0.2 cm$^3$/g and 1.4 cm$^3$/g, preferably between 0.35 cm$^3$/g and 1.1 cm$^3$/g.

The average pore diameter as well as the tortuosity factor (contorsion factor) of the sorbent selected for the inventive method depend particularly on the steric size of the correspondingly used dye which is to remove from the supercritical fluid. Particularly good deposition (emitting) rates can be obtained in the inventive method when such a sorbent is selected which has an average pore diameter of between 2 nm and 400 nm, preferably between 10 nm and 150 nm, and/or which has tortuosity factor of between 2 and 9, preferably between 3.5 and 7.

In order to guarantee a particularly economical removal of the at least one unabsorbed dye form the fluid, a further development of the afore described embodiment of the inventive method provides that hereby the fluid containing the at least one unabsorbed dye is transported through the second circulation system with a transport speed of between 20 mm/s and 80 mm/s, preferably with a speed of between 40 mm/s and 60 mm/s.

In respect to the time being required for the removal of the unabsorbed dye from the fluid being used for the dyeing particularly before and/or during the realisation of the pressure decrease, temperature decrease and/or volume increase, as it is indicated in the afore described embodiments of the inventive method, it is to be noted that this time varies between 2 minutes and 15 minutes, preferably between 5 minutes and 10 minutes, when the fluid containing the unabsorbed dye is continuously drawn off the autoclave and the corresponding circulation system and transmitted into the second circulation system for the removal of the unabsorbed dye and when subsequently the fluid which is free of the unabsorbed dye is continuously introduced into the autoclave and/or the corresponding circulation system. In other words, the afore described embodiments of the inventive method preferably require a time of between 2 minutes and 15 minutes, preferably between 5 minutes and 10 minutes, for the removal of the unabsorbed dye from the correspondingly used fluid, so that the dyeing is terminated after the expiration of this time.

The at least one unabsorbed dye being afore as well as subsequently mentioned, whereby this formulation means that the fluid does not only contain a single unabsorbed dye but also a mixture of several unabsorbed dye, whereby the latter case occurs more often, since textile substrates are usually dyed not only with one single dye but with a mixture of two to about eight dyes, preferably with a mixture of two to four dyes.

The third fundamental option for the main removal of the unabsorbed dye is characterised in that at the end of the dyeing and thus immediately before and/or during the realisation of the pressure decrease, temperature decrease and/or volume increase the fluid still containing the dye and used for the actual dyeing is diluted by a further dye-free fluid. In other words, according to this third option the fluid containing in the autoclave and used for the dyeing is substituted partly or completely by at least one further fluid being introduced into the dyeing autoclave or into the first circulation system, so that a unabsorbed dye can correspondingly not be precipitated on the textile substrate.

Particularly if herefore such a liquid is used as further fluid which is introduced into the autoclave or into the first circulation system before particularly during the realisation of the pressure decrease, temperature decrease and/or volume increase, impeccable fastnesses can be obtained with a low expense by applying these embodiments of the inventive method.

A particularly rapid main removal of the unabsorbed dye from the fluid can be obtained in the afore described third option of the inventive method, when the further fluid is a solvent for the used at least one dye.

In respect to the liquids being used as further fluid for the dilution and/or substitution of the fluid containing the unabsorbed dye, as this is described above in the embodiments of the inventive method, particularly liquid carbon dioxide, water or glycols, preferably propylenglycol, are preferred.

In the above described embodiments of the inventive method it was repeatedly pointed out that the at least one dye containing in the fluid and not absorbed by the textile substrate is mainly removed immediately before the realisation of the pressure decrease and/or temperature decrease and/or volume increase. A high degree of effectiveness of this removal of the unabsorbed dye can be obtained in the inventive method, when the corresponding removal of the unabsorbed dye from the used fluid is carried out immediately before and during the realisation of the pressure decrease, temperature decrease and/or volume increase. In order to obtain acceptable fastnesses, it is mostly sufficient to mainly remove the at least one dye not being absorbed by the textile substrate out of the fluid correspondingly used for the dyeing immediately before or during the realisation of the pressure decrease, temperature decrease and/or volume increase, whereby a removal of the unabsorbed dye carried out immediately before the realisation of the pressure decrease, temperature decrease and/or volume increase is preferred, since this variant of the inventive method guarantees a high reproducibility in respect to the obtained colors as well as to the obtainable fastnesses.

As already several times mentioned above, the inventive method is preferably applied for such dyeings which use as dye a disperse dye in connection with carbon dioxide as supercritical fluid. Herefore sewing yarns consisting of polyester are preferably chosen as textile substrate, whereby these sewing yarns are then dyed in the form of a bobbin, particularly in the form of an X-bobbin.

In the inventive method certainly also another supercritical fluid or fluid mixture can be used, whereby herefore the fluids indicated in the DE-OS 39 06 724 can be selected under the conditions mentioned therein.

In the afore described embodiments of the inventive method it is also possible to exchange the afore described solid sorbent by a liquid sorbent mixture which then absorbs the at least one unabsorbed dye. Herefore particularly such liquids can be selected which show a good solving capacity for the dye. This means for disperse dyes and for the supercritical fluid carbon dioxide that hereby alcohols, particularly methanol, ethanol, isopropanol and/or isobutanol, acetone, chloroform and/or dimethylformamid, can be chosen as liquid sorbents.

The term "unabsorbed dyes" means such dyes, which are not absorbed by the textile substrates at the end of the dyeing.

Advantageous developments of the inventive method are described in the subclaims.

Figure 2:
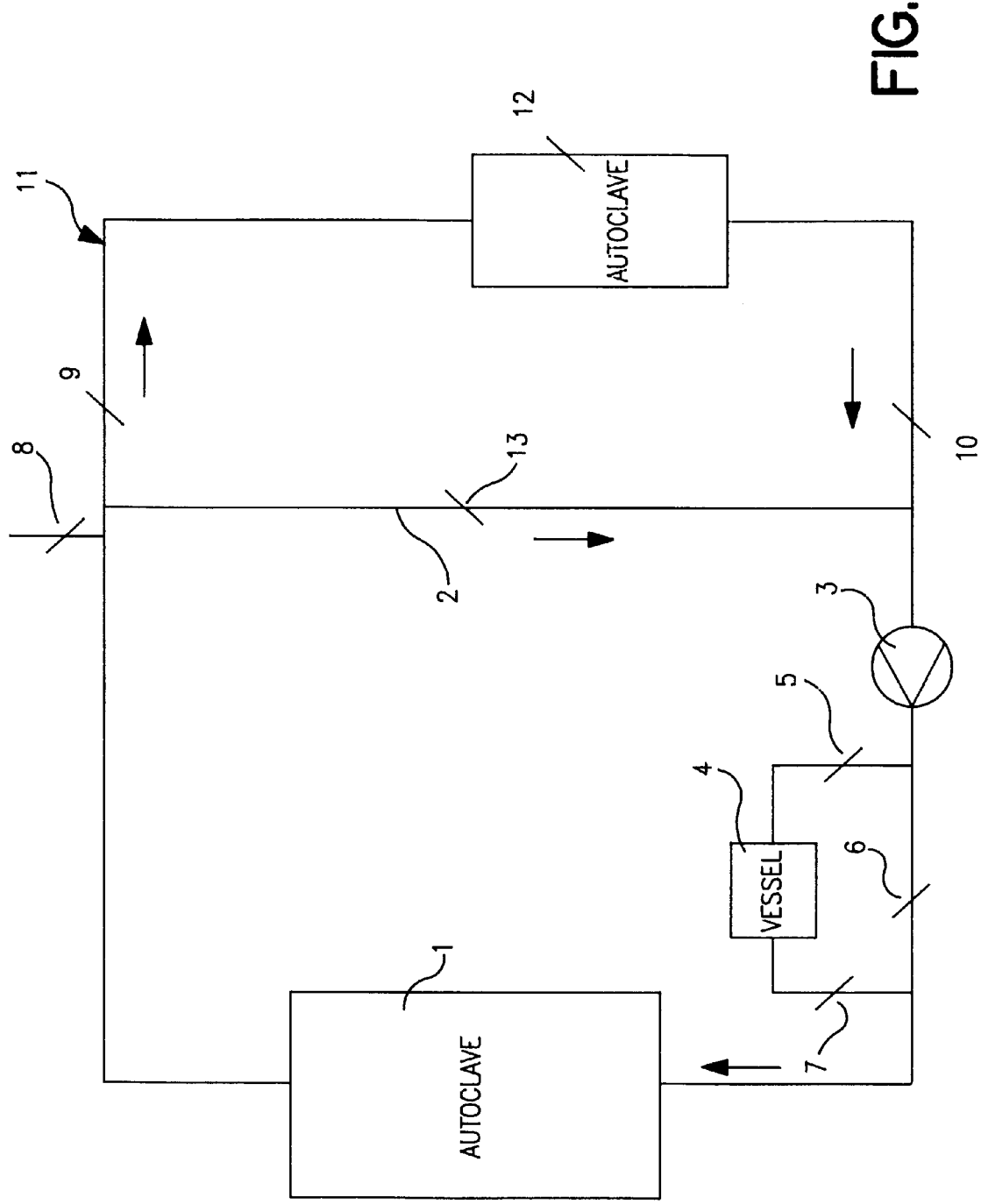

The inventive method is subsequently explained in detail in by example 2 in connection with the drawing. The figures show:

FIG. 1 the flow chart of a conventional device;

FIG. 2 the flow chart of a first embodiment of the device, as it was used in the example 2 subsequently described; and FIG. 3 the flow chart of the device shown in FIG. 2, but modified.

EXAMPLE 1

On a usual practice device a column consisting of four sewing yarn-X-bobbins with a total weight of 9.8 kg was dyed in supercritical carbon dioxide. Hereby the following dyes were used:

0.2% by weight of a yellow disperse dye, 0.8% by weight of a blue disperse dye.

The used disperse dyes were pure dyes, meaning that they did not contain floating agents or other additives.

The dyeing conditions were the following ones:

Supercritical fluid: carbon dioxide

Bath ratio: 1:5

Temperature: 130° C.

Pressure: 250 bar

Dyeing time: 35 minutes

At the end of the dyeing the pressure was reduced in 10-bar steps to a final pressure of 80 bar within 25 minutes, whereby when the final pressure of 80 bar was obtained a continuous pressure decrease down to normal pressure took place within four minutes.

The water resistance, washing fastness, friction resistance and the sweat resistance of the yarns dyed that way were measured according to the DIN-norms. All fastnesses were extremely bad and had a maximum level of fastness of 2, marked according to the greyness standard scale.

In order to realise the afore described usual dyeing in supercritical carbon dioxide, the conventional device shown in FIG. 1 comprises an autoclave 1 for taking up the column of the four sewing yarn-X-bobbins. The dyeing autoclave 1 is equipped with a first circulation system, whereby the first circulation system comprises a corresponding tube conduct system 2. A circulation pump 3 is arranged within this tube conduct system 2 of the first circulation system.

A dye-preparing vessel 4 is located in a bypass to the tube conduct system 2.

The tube conduct system 2 furthermore comprises a feeding for carbon dioxide as well as a heat exchanger (both not shown).

The above described conventional practice device operates in the following way:

First of all the column of the four sewing yarn-X-bobbins is arranged within the autoclave 1, so that after closing the autoclave the corresponding tube conduct system 2 of the first circulation system as well as the autoclave 1 itself is filled with supercritical carbon dioxide by means of the feeding and a pressure increasing pump not shown. Hereafter the circulation pump 3 is taken into operation which causes the superfusion of the supercritical carbon dioxide through the tube conduct system 2 and the autoclave 1 in the direction of the arrow.

After achieving the precedently indicated final temperature and the afore mentioned pressure, the valves 5 and 7 of the bypass are opened, so that the supercritical carbon dioxide flows through the dye-preparing vessel 4 and solves the afore indicated dyes. At this time the valve 6 is closed.

After the expiration of the dyeing time the device is released by valve 8 in the afore described manner.

EXAMPLE 2

The schematically shown device in FIG. 2 also comprises, like the precedently described device shown in FIG. 1, an autoclave 1 for taking up the column of the four sewing yarn-X-bobbins. The dyeing autoclave 1 is equipped with a first circulation system, whereby the first circulation system comprise a corresponding tube conduct system 2. A circulation pump 3 is located within the tube conduct system 2 of the first circulation system.

A dye-preparing vessel 4 is arranged in a bypass to the tube conduct system 2.

The tube conduct system 2 furthermore comprises a feeding for carbon dioxide as well as a heat exchanger (both not shown).

In addition to the first circulation system, the device schematically shown in FIG. 2 comprises a second circulation system designated with 11. Hereby the second circulation system 11 which can also be designated with adsorption circulation comprises two valves 9 and 10 as well as an autoclave 12, whereby the autoclave 12 is filled with a subsequently described sorbent.

The above described device shown in FIG. 2 operates in the following way:

First of all the column of the four sewing yarn-X-bobbins is arranged within the autoclave 1, as this is already described precedently in the example 1. After closing the autoclave the corresponding tube conduct system 2 of the first circulation system as well as the autoclave 1 itself is filled with supercritical carbon dioxide by means of the feeding and a pressure increasing pump not shown. Hereafter the circulation pump 3 is taken into operation which causes the is superfusion of the supercritical carbon dioxide through the tube conduct system 2 and the autoclave 1 in the direction of the arrow. At this time the valves 9 and 10 are closed and the valve 13 is opened.

After achieving the final temperature and the afore mentioned pressure precedently mentioned in example 1, the valves 5 and 7 of the bypass are opened, so that the supercritical carbon dioxide flows through the dye-preparing vessel 4 and solves the afore indicated dyes. At this time the valve 6 is closed.

After the expiration of the dyeing time of 35 minutes the valves 9 and 10 shown in FIG. 2 are opened and the valve 13 is closed. This causes that the second circulation system 11 functioning as bypass and the autoclave 12 located therein is superfused in the direction of the arrow.

After a dwelling time of five minutes the device is released by the valve 8 in such a way as it is precedently described in example 1.

The autoclave 12 is filled with a silica gel, type Trysil. Hereby this silica gel has a particle size of between 2 mm and 8 mm, a density of 2,200 $kg/m^3$, a bulk density of 550 $kg/m^3$, a porosity of 0.05, an inner surface of about 450 $m^2/g$, a pore volume of 0.4 $cm^3/g$, a middle pore diameter of between 4 nm and 10 nm and a tortuosity factor of 5.0.

In order to avoid an undesired pressure fluctuation and/or a temperature fluctuation when the first circulation system is connected with the second circulation system, the second circulation system had been filled before with supercritical carbon dioxide at a pressure of 250 bar and at a temperature of 130° C.

The dyeing conditions used in example 2 corresponded with the conditions as they are precedently indicated in example 1.

The yarns dyed in the device shown in FIG. 2 had an essentially better fastness level, whereby the water resistance, washing fastness, friction resistance and the sweat resistance were also measured. The fastness level of the dyeing generated that way laid over 4 for all measured fastnesses, defined according to the usual greyness standard scale.

Figure 3:
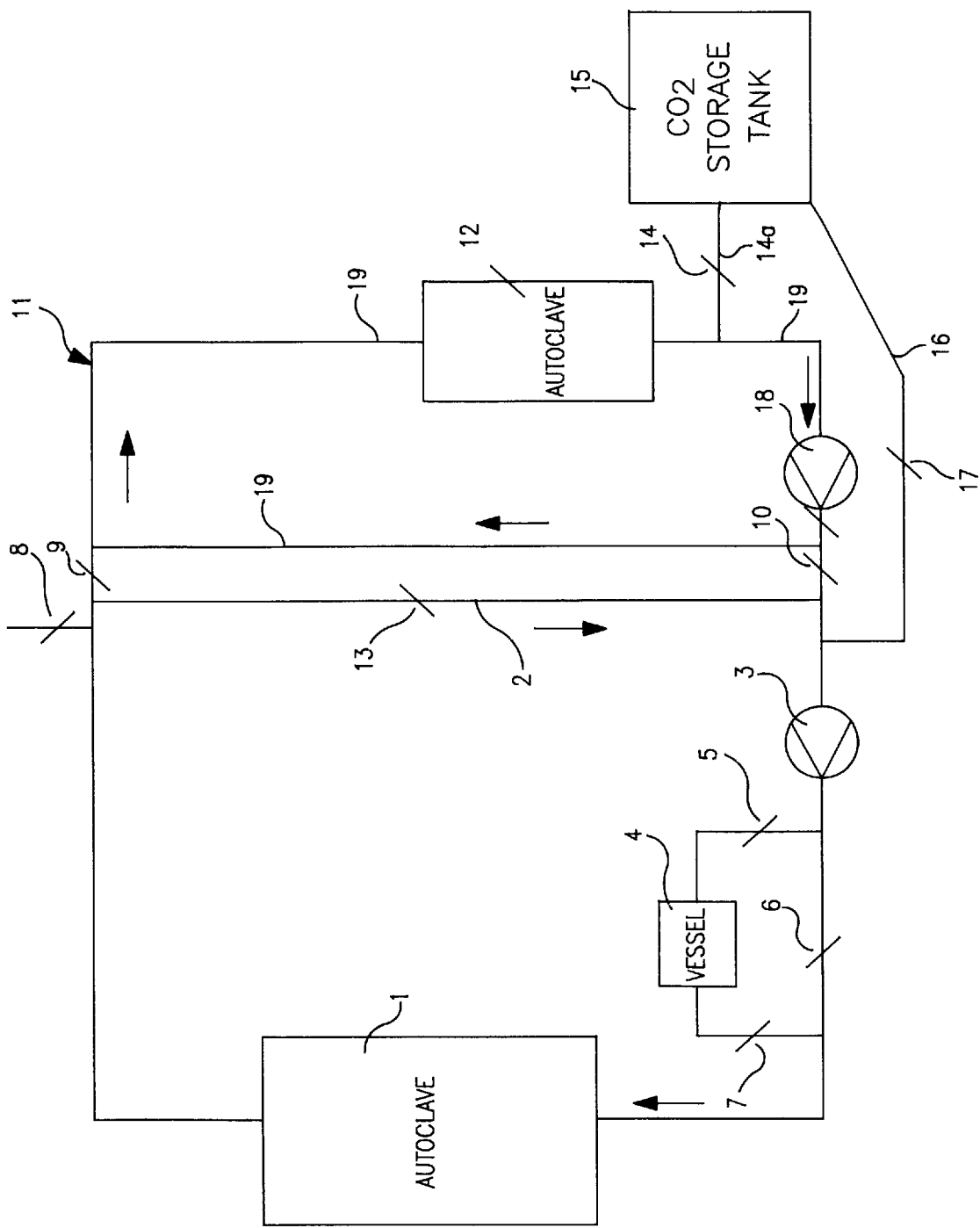

The device schematically shown in FIG. 3 differs from the afore described device in its forming of the second circulation system 11 being also precedently named adsorption circulation.

The device shown in FIG. 3 comprises an autoclave 1 for taking up the column of the four sewing yarn-X-bobbins. The dyeing autoclave 1 is equipped with a first circulation system, whereby the first circulation system comprises a corresponding tube conduct system 2. A circulation pump 3 is arranged within this tube conduct system 2 of the first circulation system.

A dye-preparing vessel 4 is located in a bypass to the tube conduct system 2.

The tube conduct system 2 furthermore comprises a feeding for carbon dioxide as well as a heat exchanger (both not shown).

The device schematically shown in FIG. 3 is furthermore equipped with a second circulation system being designated with 11. Hereby this second circulation system 11 comprises the valves 9, 10, 14 and 17, whereby the valves 9 and 10 are formed as locking valves between the two circulation systems and the valves 17 and 14 are formed as filling valve, respectively as draining valve. Moreover, a second circulation pump 18 is located within the tube conduct system 19 of the second circulation system 11.

A store tank for carbon dioxide 15 is arranged within the second circulation system 11, whereby the store tank 15 is connected, on one hand, with the tube conduct system 19 by means of the tube 14a and the valve 14 located therein and, on the other hand, with tube conduct system 2 of the first circulation system by means of the tube 16 and the valve 17 located therein.

The device shown in FIG. 3 operates in the following way:

First of all the column of the four sewing yarn-X-bobbins is arranged within the autoclave 1, so that after closing the autoclave the corresponding tube conduct system 2 of the first circulation system as well as the autoclave 1 itself is filled with supercritical carbon dioxide by means of the feeding and a pressure increasing pump not shown. Hereafter the circulation pump 3 is taken into operation which causes the superfusion of the supercritical carbon dioxide through the tube conduct system 2 and the autoclave 1 in the direction of the arrow.

After achieving the precedently indicated final temperature and the afore mentioned pressure, the valves 5 and 7 of the bypass are opened, so that the supercritical carbon dioxide flows through the dye-preparing vessel 4 and solves the afore indicated dyes. At this time the valve 6 is closed.

After the expiration of a given dyeing time the valves 9 and 10 are opened, so that the second circulation system 11 is filled by means of the tube conduct system 2 of the first circulation system. At this time the valve 13 is closed. In order to avoid hereby a pressure decrease in the first circulation system, fresh carbon dioxide not containing dyes is introduced into the first circulation system from the store tank 15 by means of the conduct 16 and the opened valve 17.

After the filling of the second circulation system 11 the valves 9, 10 and 17 are closed, whereas the valve 13 is opened again. At this time the dyeing in the first circulation system 2 is carried on. Concurrently and indepently hereon the fluid containing the dye residues is transported in the direction of the arrow through the autoclave 12 in the second circulation system 11 by means of the pump 18, whereby the autoclave 12 is, for example, filled with the afore described sorbent.

After a given dwelling time the supercritical fluid existing in the second circulation system 11 is then completely free of the unabsorbed dye, so that it can introduced into the store tank 15 by means of opened valve 14 and the tube 14*a*.

The device shown in FIG. 3 is used when the transport speed of the fluid in the first circulation system differs clearly from the transport speed of the fluid in the second circulation system 11, meaning thus the adsorption circulation.

A process is disclosed for dyeing a textile substrate, in particular for dyeing polyester yarns. The substrate to be dyed is placed in an autoclave and a supercritical fluid containing at least one dyestuff is applied to it, i.e. passed through it. The supercritical fluid is pumped continuously via a circulation system allocated to the autoclave, and, in order to terminate the dyeing process, the pressure and/or temperature is lowered and/or the volume is increased. Immediately before and/or during the pressure and/or temperature reduction and/or volume increase, as much as possible of any residual dye which has not been transferred to the substrate is removed from the fluid.

We claim:

1. A method for the dyeing of a textile substrate, comprising:
    arranging the textile substrate within an autoclave;
    exposing the textile substrate to a supercritical fluid containing at least one dye, said supercritical fluid being circulated through said autoclave via a first circulation system in communication therewith;
    converting said supercritical fluid from a supercritical state to a non-supercritical state following completion of said step of exposing; and
    initiating at least partial removal of said at least one dye remaining as unabsorbed dye from said supercritical fluid prior to a completion of conversion of said supercritical fluid to a non-supercritical state.

2. The method according to claim 1, wherein said step of initiating is started prior to said step of converting.

3. The method according to claim 1, wherein said step of initiating is started during said step of converting.

4. The method according to claim 1, wherein said step of converting includes decreasing a pressure of said supercritical fluid.

5. The method according to claim 1, wherein said step of converting includes decreasing a temperature of said supercritical fluid.

6. The method according to claim 1, wherein said step of converting includes increasing a volume of said supercritical fluid.

7. The method according to claim 1, wherein the textile substrate is a polyester yarn.

8. The method according to claim 1, wherein said unabsorbed dye is removed from said supercritical fluid immediately before said step of converting.

9. The method according to claim 1, wherein said unabsorbed dye is removed from said supercritical fluid at least up to about 80% by weight relative to a total amount of the unabsorbed dye in the supercritical fluid.

10. The method according to claim 9, wherein said step of initiating includes transferring the supercritical fluid containing the unabsorbed dye from the autoclave and the first circulation system connected therewith into a second circulation system, the unabsorbed dye being at least partially removed from the supercritical fluid while in said second circulation system.

11. The method according to claim 10, wherein said supercritical fluid is transferred back into the autoclave and said first circulation system following said at least partial removal of the unabsorbed dye.

12. The method according to claim 10, wherein, while in the second circulation system, the unabsorbed dye is removed by means of a pressure decrease of the supercritical fluid.

13. The method according to claim 10, wherein, while in the second circulation system, the unabsorbed dye is removed by means of temperature decrease of the supercritical fluid.

14. The method according to claim 10, wherein, while in the second circulation system, the unabsorbed dye is removed by means of a volume increase of the supercritical fluid.

15. The method according to claim 10, wherein the second circulation system is arranged as a bypass of the first circulation system.

16. The method according to claim 10, wherein at least one sorbent is provided in the second circulation system for removal of the unabsorbed dye.

17. The method according to claim 10, wherein the unabsorbed dye is removed by adsorption by at least one sorbent in the second circulation system.

18. The method according to claim 10, wherein the unabsorbed dye is removed by absorption by at least one sorbent in the second circulation system.

19. The method according to claim 16, wherein said sorbent is selected from the group consisting of activated aluminum oxides, silica gels, activated carbons, zeolithic molecular sieves and mixtures thereof.

20. The method according to claim 19, wherein said sorbent has a particle size of between about 0.5 mm and about 20 mm.

21. The method according to claim 20, wherein said particle size is between about 1 mm and about 10 mm.

22. The method according to claim 19, wherein said sorbent has a density varying between about 1,800 kg/m$^3$ and about 3,500 kg/m$^3$.

23. The method according to claim 22, wherein said density varies between about 2,000 kg/m$^3$ and about 3,000 kg/m$^3$.

24. The method according to claim 19, wherein said sorbent has a porosity varying between about 0.3 and about 0.8.

25. The method according to claim 24, wherein said porosity varies between about 0.4 and about 0.7.

26. The method according to claim 19, wherein the selected sorbent has an inner surface of between about 200 m$^2$/g and about 1,500 m$^2$/g.

27. The method according to claim 26, wherein said inner surface is between about 300 m$^2$/g and about 1,200 m$^2$/g.

28. The method according to claim 19, wherein said sorbent has a pore volume varying between about 0.2 cm$^3$/g and about 1.4 cm$^3$/g.

29. The method according to claim 28, wherein said pore volume varies between about 0.35 cm$^3$/g and about 1.1 cm$^3$/g.

30. The method according to claim 19, wherein said sorbent has a middle pore diameter varying between about 2 nm and about 400 nm.

31. The method according to claim 20, wherein said middle pore diameter varies between about 10 nm and about 150 nm.

32. The method according to claim 19, wherein said sorbent has a tortuosity factor of between about 2 and about 9.

33. The method according to claim 32, wherein said tortuosity factor is between about 3.5 and about 7.

34. The method according to claim 1, wherein the supercritical fluid containing the unabsorbed dye is transported through the second circulation system with a transport speed of between about 20 mm/s and about 80 mm/s.

35. The method according to claim 34, wherein said transport speed is between about 40 mm/s and about 60 mm/s.

36. The method according to claim 1, wherein the fluid containing the at least one unabsorbed dye is transported through the second circulation system between about 2 minutes and about 15 minutes.

37. The method according to claim 36, wherein the fluid containing the at least one unabsorbed dye is transported through the second circulation system between about 5 minutes and about 10 minutes.

38. The method according to claim 1, wherein:

said textile substrate is a polyester sewing yarn;

said at least one dye is a disperse dye; and the supercritical fluid is carbon dioxide.

39. The method according to claim 1, wherein said unabsorbed dye is removed immediately before said step of converting by diluting said supercritical fluid with a further fluid substantially free of dyes.

40. The method according to claim 1, wherein said unabsorbed dye is removed immediately before said step of converting by displacing said supercritical fluid with a further fluid substantially free of dyes.

41. The method according to claim 39, wherein said further fluid is a liquid.

42. The method according to claim 40, wherein said further fluid is a liquid.

43. The method according to claim 39, wherein said unabsorbed dye is dissolved in said further fluid.

44. The method according to claim 40, wherein said unabsorbed dye is dissolved in said further fluid.

45. The method according to claim 39, wherein said further fluid is selected from the group consisting of liquid carbon dioxide, water, glycol and mixtures thereof.

46. The method according to claim 40, wherein said further fluid is selected from the group consisting of liquid carbon dioxide, water, glycol and mixtures thereof.

47. The method according to claim 45, wherein said glycol is propylenglycol.

48. The method according to claim 46, wherein said glycol is propylenglycol.

49. The method according to claim 1, wherein said supercritical fluid perfuses said textile substrate in said step of exposing.

50. The method according to claim 1, wherein said supercritical fluid flows through said textile substrate in said step of exposing.

* * * * *